(12) United States Patent
Chen et al.

(10) Patent No.: US 7,906,047 B2
(45) Date of Patent: Mar. 15, 2011

(54) INJECTION MOLDING A LENS ONTO A COATED OPHTHALMIC WAFER

(75) Inventors: Xu Chen, St. Petersburg, FL (US); Joey Oliveros Obordo, Seminole, FL (US); Hsinjin Yang, Palm Harbor, FL (US)

(73) Assignee: Essilor International (Compagnie Generale d'Optique), Charenton (FR)

( * ) Notice: Subject to any disclaimer, the term of this patent is extended or adjusted under 35 U.S.C. 154(b) by 784 days.

(21) Appl. No.: 11/313,500

(22) Filed: Dec. 21, 2005

(65) Prior Publication Data

US 2007/0138664 A1 Jun. 21, 2007

(51) Int. Cl.
*B29D 11/00* (2006.01)

(52) U.S. Cl. ........ 264/1.7; 264/1.1; 264/1.29; 264/1.31; 264/1.32; 264/1.34; 264/1.8; 264/2.4; 264/2.7; 264/513; 264/255; 264/259; 264/265; 264/338; 427/135; 427/162

(58) Field of Classification Search ............... 264/1.7, 264/1.1, 1.29, 1.31, 1.32, 1.34, 1.8, 2.4, 2.7, 264/33, 51, 513, 255, 259, 265, 338; 427/135, 427/162

See application file for complete search history.

(56) References Cited

U.S. PATENT DOCUMENTS

| | | | |
|---|---|---|---|
| 4,364,878 A | 12/1982 | Laliberte et al. | |
| 5,149,181 A | 9/1992 | Bedford | |
| 5,376,317 A | 12/1994 | Maus et al. | |
| 5,777,053 A * | 7/1998 | McBain et al. | 526/301 |
| 5,943,957 A | 8/1999 | Mason | |
| 6,180,043 B1 | 1/2001 | Yonemochi et al. | |
| 6,638,450 B2 * | 10/2003 | Richard | 264/1.32 |
| 6,676,877 B2 | 1/2004 | Thompson | |
| 2002/0050658 A1 | 5/2002 | Richard | |
| 2003/0077425 A1 | 4/2003 | McBain et al. | |
| 2003/0082344 A1 | 5/2003 | Straus et al. | |
| 2003/0099809 A1 | 5/2003 | Straus et al. | |
| 2003/0152693 A1 | 8/2003 | Su et al. | |
| 2004/0125335 A1 | 7/2004 | Vu | |
| 2007/0296094 A1 * | 12/2007 | Jiang et al. | 264/1.7 |

FOREIGN PATENT DOCUMENTS

| | | |
|---|---|---|
| EP | 1 207 031 | 5/2002 |
| WO | WO 03/031138 | 4/2003 |
| WO | WO 03/035354 | 5/2003 |
| WO | WO 2004/011235 | 2/2004 |
| WO | WO 2004/048068 | 6/2004 |
| WO | WO 2004/048076 | 6/2004 |

OTHER PUBLICATIONS

International Search Report & Written Opinion from PCT/IB2006/004142, 11 pages, Aug. 31, 2007.
Phernell Walker, The Truth about Base Curves, The American Board of Opticianry Master in Ophthalmic Optics Program, 15 pages.

* cited by examiner

*Primary Examiner* — Jeffrey Wollschlager
*Assistant Examiner* — Stella Yi
(74) *Attorney, Agent, or Firm* — Keusey & Associates, P.C.

(57) ABSTRACT

A method of in-mold coating utilizing an injection molding machine oriented to a horizontal parting line. At the beginning of the cycle the mold opens and a charge of liquid coating solution is deposited onto the lower mold insert. A ophthalmic wafer is deposited on the coating to spread it across the insert surface. The mold is closed and a pre-cure phase elapses before the thermoplastic resin is injected into the mold cavity above the wafer. The process provides coated and functionally enhanced lenses upon ejection from the molding machine.

23 Claims, 3 Drawing Sheets

INJECTION MOLDING A LENS ONTO A COATED OPHTHALMIC WAFER

BACKGROUND OF THE INVENTION

1. Field of the Invention

The invention relates to depositing a coating solution and an ophthalmic wafer into an open mold prior to injection molding an optical lens on top of the wafer to produce a functionally enhanced coated lens.

2. The Prior Art

In-situ coating via a direct injection process, so called in-mold coating was originally developed to improve the surface appearance of sheet molding compound (SMC) parts molded by compression molding. Recent years it's been applied to injection molded thermoplastic parts as it is described in the following patent and patent application: U.S. Pat. No. 6,180,043, U.S. Pat. No. 6,676,877, US 2003-0077425, US 2003-0082344, or US 2003-0099809)

For the regular injection molding process, the thermoplastic piece is ejected out of the mold once it is rigid enough to resist the deformation caused by ejection. For in-situ coating injection, it integrates with injection molding via injecting thermoset coating liquid on the exterior surface of the thermoplastic piece when the thermoplastic piece is solidified to the degree that it won't be damaged by the coating injection. More coating is injected after the desired surface coverage is obtained to achieve certain coating thickness. The coating thermally cures by the residual heat from the thermoplastic piece and the continuously heated mold.

U.S. Published Patent Application 2004/0125335 discloses a film insert molding technique where the film is coated prior to placement in the injection molding cavity. The coating consists of an epoxy functional silane dissolved in aqueous-organic solvent mixtures. The coating is applied to the film by conventional dip coating, spray coating, spin coating, etc. The coating must be pre-cured by driving off the solvent which creates VOCs. The pre-cure step must be carried out separate and independent from the mold, as the VOCs would otherwise collect in the mold cavity and adversely effect the injection molding process.

No successful application of in-situ coating via direct injection has been found on ophthalmic lens. The major challenges on this application are: development of optical quality coating system suitable for this technology, achievement of desirable coating thickness and its uniformity, process control on thermoplastic injection and the integrated coating injection.

SUMMARY OF THE INVENTION

Accordingly it is an object of the present invention to integrate a functional component along with a coating onto a lens before it is ejected from the injection molding machine.

It is a further object of the present invention to provide manufactured lenses which have coated photochromic properties upon being ejected from the molding machine.

It is a further object of the present invention to provide manufactured lenses which have coated polarized properties upon being ejected from the molding machine.

The present invention discloses a method to manufacture in-mold coated thermoplastic ophthalmic lens. More particularly the invention discloses a method to manufacture an in-mold coated thermoplastic ophthalmic lens via a thermoplastic wafer. The method utilizes an injection molding machine having a horizontally oriented parting line with a metal concave insert disposed in the lower stationary mold half, wherein the insert has a base curve C and is heated to temperature T that is below a thermoplastic glass transition temperature $T_G$. An unpressurized liquid coating drop is deposited onto the concave insert while the mold is open. A functional ophthalmic wafer having a concave side and a convex base curve C is provided to spread the coating across the entire surface of the insert. The mold is closed to heat and pre-cure the coating. Thermoplastic resin is injected via an edge gate onto the concave side of the wafer. A functionally enhanced coated optical lens is integrally formed by allowing the resin to cool towards T.

The insert temperature T is in the range from about 240° F. to about 290° F. For polycarbonate a temperature of about 250° F. is set. The liquid coating has a sufficiently low viscosity whereby it is spread across the entire surface of the insert under the weight of the wafer. The coating is spread in the absence of back pressure. The closing step includes closing the mold and pausing to heat and pre-cure the coating. The injecting step initiates after a two minute pause. The injecting step initiates after the coating has pre-cured sufficiently to resist deformation by the force of the injected resin.

The mold includes a movable top half that opens and closes vertically. The coating drop is a full metered charge of coating modified by diluents to avoid curing until the coating completely covers the convex base of the wafer. The full metered charge of coating is deposited in an amount ranging between 0.1 ml to 0.8 ml. In some applications an amount ranging between about 0.2 ml to about 0.5 ml is used. The wafer is a polarized film and the integrally forming step comprises integrally forming a polarized lens in which the film is protected on one side by the thermoplastic lens and on the other side by the cured coating. The wafer may also be a photochromic film and the integrally forming step comprises integrally forming a photochromic lens in which the film is protected on one side by the thermoplastic lens and on the other side by the cured coating.

The thermoplastic resin and the wafer are independently selected from the group consisting of polymethyl(meth)acrylate, polycarbonate, polycarbonate/polyester blends, polyamide, polyester, cyclic olefin copolymers, polyurethane, polysulfone and combinations thereof. The resin and the wafer may include the same material. The resin and wafer may include polycarbonate derivatives.

The liquid coating includes one or more (meth)acrylate compounds, a catalyst, and a metal salt. The liquid coating includes at least one hexafunctional acrylate compound, at least one difunctional acrylate compound, and at least one monofunctional acrylate compound. The catalyst is a alkyl aralkyl peracide compound. The metal salt is cobalt naphthenate.

The invention also covers functionally enhanced coated thermoplastic optical lenses manufactured by the process. For example, polarized coated thermoplastic optical lenses photochromic coated thermoplastic optical lenses.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

The present invention describes a method to manufacture an in-mold coated thermoplastic optical lens and the resulting products. An overview of the method includes the following steps:
 a. deposit coating liquid on the heated concave metal inserts on the lower mold half;
 b. put a pre-formed thermoplastic wafer, on top of the coating. The base curve of the wafer matches with the insert base curve.
 c. close the mold;
 d. actuate the plastic melt injection cycle after 2 minutes for coating pre-cure;
 e. at the end of the lens molding cycle, open the mold and eject the coated lens.

In step b, the pre-deposited coating was spread out by the weight of the thermoplastic wafer to cover the whole surface of the metal insert. The 2 minute delay in step d is very important in the method. Indeed during this time delay, the coating can be partially thermally cured, by the heat from the mold plates, to a degree that it can be sustained and won't be damaged by the subsequently injected thermoplastic melt. At the end of the process the functional film becomes an integral part of the lens with front surface coated.

Figure 1:
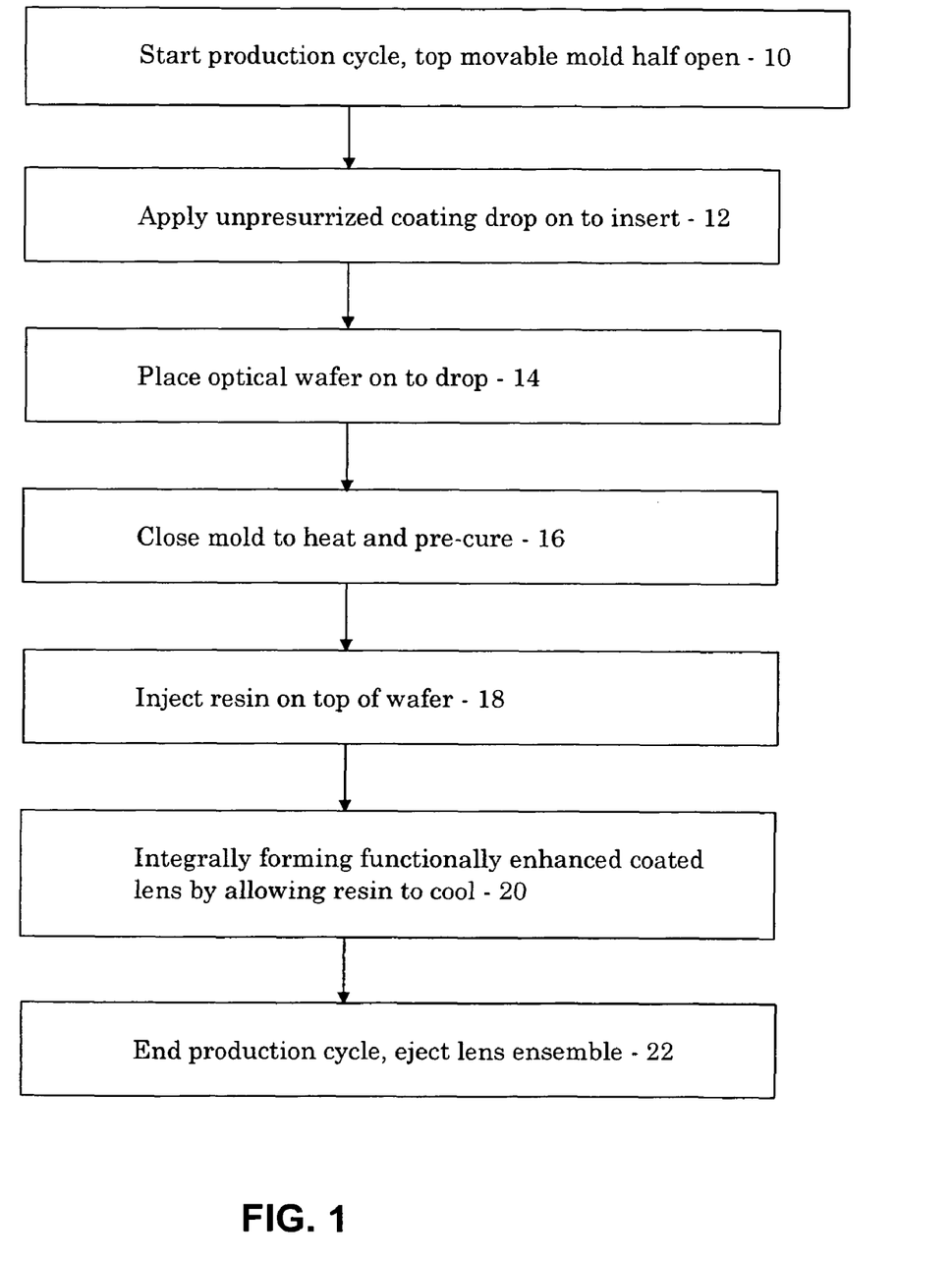
FIG. 1 is a flowchart describing an exemplary method according to an embodiment of the invention.

A more detailed description of the method steps shall be provided with reference to the flowchart of FIG. 1. A conventional injection molding cycle is modified by adding steps relating to the integration of the optical coating carrier and in-mold coating. The cycle is further modified by extending the pre-injection phase.

In step 10, the cycle begins with the top movable mold half opened vertically. As will be discussed in greater detail below, the mold inserts are heated to a temperature T about 250 degrees F., which is below a thermoplastic glass transition temperature $T_G$. In step 12, a drop of acrylate based coating solution is deposited onto the lower concave insert. The coating is applied as an unpressurized coating drop from a coating dispenser. For example, the full metered charge of coating, sufficient to cover the entire surface of the optical coating carrier at the desired thickness, is applied as one drop.

Directly thereafter, within 2-10 seconds, an ophthalmic wafer is placed on to the coating drop, in step 14. The wafer is a uniformly thin, optical grade lens, and has no relation to semiconductors. The wafer may be plano, that is, it is curved and has a zero power. The process according the invention has particular applicability to incorporating functional optical wafers into a coated lens ensemble. The term wafer includes optical grade carriers and films. Photochromic carriers, wafer or films are well suited for use in the inventive process. Polarized carriers, wafers or films are also well suited because they tend to be very delicate, and the invention affords a high degree of scratch protection by sandwiching the polarized film in between a protective coating and a thermoplastic lens. The wafers may be on the order of 0.5 mm to 1.5 mm thick. The viscosity of the coating solution is adjusted so that the weight of the wafer is sufficient to spread the coating into a uniformly thin layer across the entire concave insert surface. After the coating cures it remains as a uniformly thin thermoset layer across the entire convex surface of the carrier.

In step 16, the mold is closed, and the heat that was being lost through the open parting line begins to build inside the mold cavity. As the coating is spread over the heated insert, and as the temperature rises in the cavity and heats the carrier, the coating begins a pre-cure phase. The clamp force may be increasing up to 100 tons or more during this pre-cure phase. The pre-cure phase may also be considered a pause stage, where the coating is allotted at least 2 minutes to initially set.

In step 18, the molten resin is injected into the cavity via an edge gate. The edge gate may be modified to insure the resin is injected on top of the carrier. The resin is injected at very high pressure, in the order of thousands of pounds per square inch, thus having the effect of compressing the carrier downward on to the coating. As a result, the coating becomes intimately bonded to the carrier as it sets into a final cured state. The molten resin may enter the cavity at above 500 degrees F. Depending on the material used in the carrier, the molten resin may intermingle, infuse or soften the upper surface of the carrier. This softening results in an integral joining between the carrier and the resin as the resin solidifies.

In step 20, the resin begins to cool to the mold solidification temperature T, and integrally forms a functionally enhanced coated lens. During this phase, a packing pressure may be utilized for a span of time. Once the lens is sufficiently rigid to resist deformation, the mold is opened and the ensemble is ejected in step 22.

Industrial Manufacturing Installation

Figures 2A, 2B:
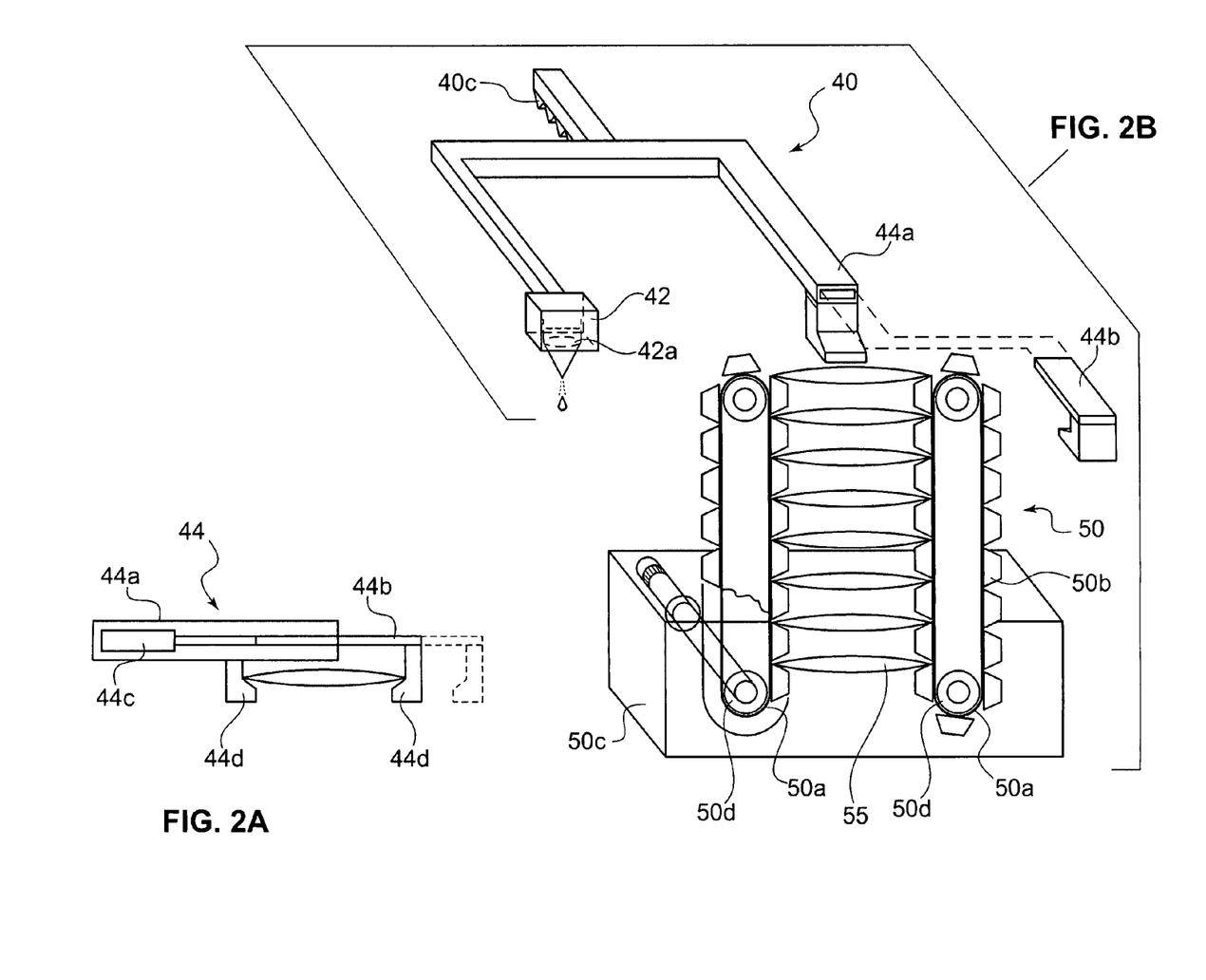
FIG. 2A is a cross-sectional view of the wafer carrying portion of the applicator arm.
FIG. 2B is a schematic view of an embodiment of the applicator arm.

As an overview of the manufacturing equipment installation, a dual-purpose applicator arm 40 is illustrated in FIGS. 2A and 2B. Arm 40 is disposed adjacent an ophthalmic lens injection molding machine, indicated generally as 60, illustrated in FIGS. 3A, 3B, and 3C. Arm 40 is adapted for reciprocating motion in two or three dimensions, into and out of the open injection molding machine.

Referring now in detail to FIGS. 2A and 2B, there is shown dual-purpose applicator arm 40 having a coating dispenser 42 and an ophthalmic wafer transporter 44. Dispenser 42 applies a drop of liquid coating solution onto the lower mold insert. A container of coating solution 42a is shown, but the solution may be stored in a common container located on another portion of arm 40. The system controller commands the dispenser to apply a metered charge of coating, at the appropriate time during the manufacturing cycle. Sensors may be employed to generate signals to the controller to indicate that the dispenser is in the proper location prior to coating application. The full metered charge may be applied in a single drop. The drop is unpressurized as it leaves the dispenser.

An embodiment of the ophthalmic wafer transporter 44 includes a frame section 44a and a telescoping section 44b. Within frame 44a, a piston-cylinder assembly or stepper motor is used to move telescoping section 44b to pickup and deposit wafers. Frame 44a and telescoping section 44b each include a gripping pad 44d and 44e, that may be made from rubber or plastic. While the pads are shown as blocks, they may be designed as articulating fingers. FIG. 2A shows transporter 44 gripping a wafer in solid line. The dotted line represents an open mode that is used to first pickup a wafer, and then secondly to deposit the wafer.

FIG. 2B illustrates a vertical wafer conveyor 50 adapted for top feed to transporter 44. With arm 40 in its home position, conveyor 50 is activated to synchronously rotate a pair of endless bands 50a to raise the next wafer 55 up to the uppermost location in between the pads of the extended transporter sections 44a and 44b. Conveyor bands 50a include conveyor pads 50b which safely retain and space wafers 55. Along the left side of the left conveyor band 50a, the pads have been indicated as continuing along the entire band in dotted line.

Conveyor bands 50a may be supported in a suitable housing base 50c with pulleys 50d driven by a stepper motor (not shown for the sake of clarity) upon activation by the system controller.

The "home position" of arm 40, mentioned above, is depicted in FIG. 3A. One or more conveyors may be provided under each transporter 44. A schematic representation of one conveyor 50 is shown in FIG. 3C. After the transporters have picked up wafers the injection molding machine 60 opens to begin the manufacturing cycle. The drawings show the top movable half of the machine removed for clarity. The illustration depicts a top plan view of the lower stationary mold half 60a. A runner system 60b places mold cavities 60c in communication with a source of molten resin at point 60d. Receivers 60e are shown surrounding cavities 60c. Thermal control fluid coupled to a thermolator may circulate through mold half 60a and receivers 60e to control the temperature of mold inserts 60f. For the two mold cavities shown, we have provided a pair of dispensers 42 and a pair of transporters 44 on one applicator arm 40. The arm may be equipped with a rack 40c driven by a motorized pinion 40d under the direction of the system controller. Rack and pinion 40d are shown schematically to the side of arm 40 for the sake of convenience, but would likely be located underneath the arm (see FIG. 2B). Pinion housing 40e may be mounted on rails 40f for lateral motion under direction from the system controller. Arm 40 may alternately be moved by an X-Y linear positioning table or an X-Y-Z 3-axis positioning table. The retracted position is designated as a position to the left of line 40a, while the extended position is designated as a position to the right of line 40b.

Figure 3A:
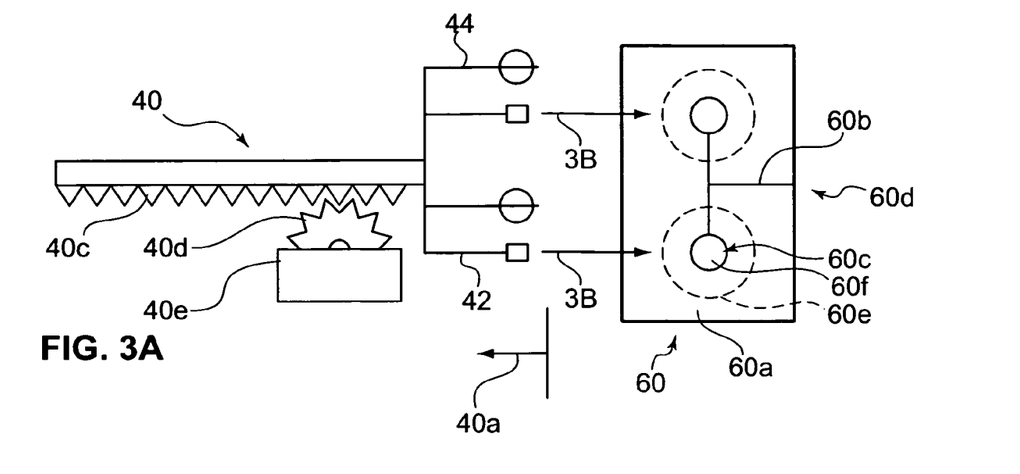
FIGS. 3A, 3B and 3C are a series of schematic views illustrating the path of the applicator arm that is used in conjunction with an injection molding machine.
Figure 3B:
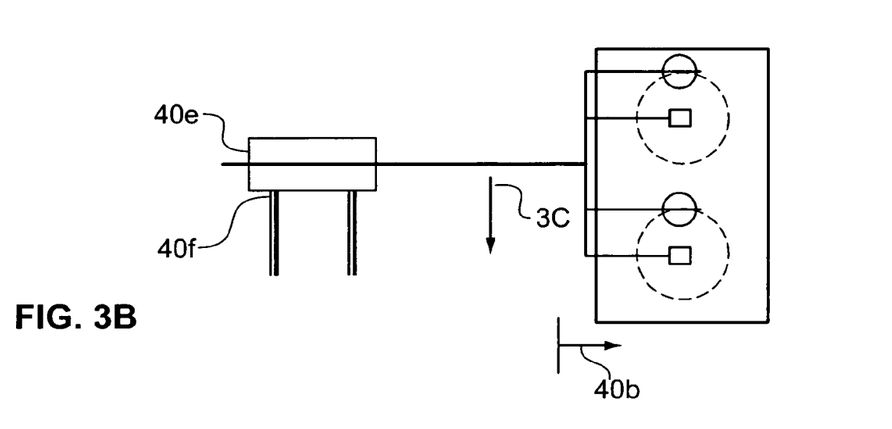
Figure 3C:
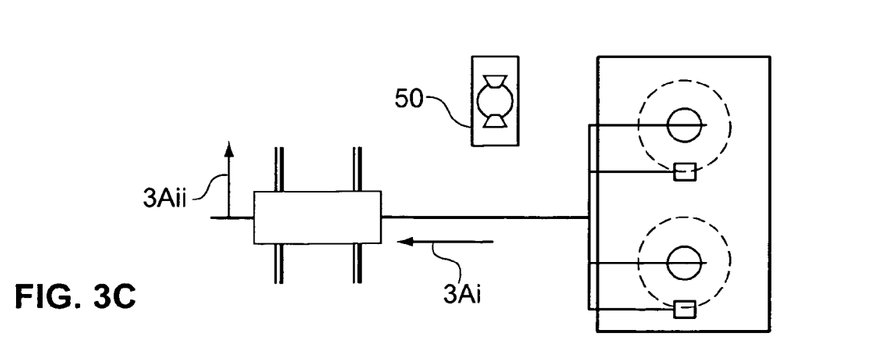

FIG. 3A denotes movement in the X direction by labels 3B, indicating that arm 40 is moving into the position shown in FIG. 3B. In FIG. 3B and 3C, inserts 60f are not shown for the sake of clarity. FIG. 3B shows the pair of coating dispensers 42 position over inserts 40f, that is in the center of receivers 60e. A full metered charge of unpressurized coating liquid is applied to the inserts. The arrow 3C denotes the following movement of arm 40, via the linear positioning system into the position shown in FIG. 3C. Now the pair of wafer transporters 44 are positioned over the inserts, and the wafers are deposited onto the liquid coating drop. Arrow 3Ai denotes retraction of arm 40 clearing the mold, so it can close for further in-mold processing. Arrow 3Aii denotes returning of arm 40 to the home position shown in FIG. 3A.

Arm 40 may be located at a height just above the top surface of lower mold half 60a. The vertical conveyor, or a suitable alternate wafer feed system, can be positioned to avoid interference with reciprocating motion of the thusly located arm. A wafer can then be delivered up into engagement with the gripping pads.

The mold may be configured with the concave inserts located within lower mold half 60a. The inserts may be arranged to mold a semi-finished lens therebetween. This has the advantage that any added thickness of the carrier need not be compensated for, since the top side of the semi-finished lens will be ground down to form a variety of lens powers in use. In an advanced version of the inventive method, a single finished lens may be molded. The top side of such single finished lens may also be coated, by coating dispenser 42. For this coating-only stage, the mold would open again after injection and arm 40 would move from its home position to the position shown in FIG. 3B to apply the coating. The mold would then re-clamp to allow the coating to cure. This advanced method would produce a single finished lens, enhanced with at coated functional wafer and also back side coated. Different coatings can be used on the front and the back. For example, by providing two dispensers at 42 a clear, protective hard coat could be applied first underneath the wafer, then an anti-reflective coating could be applied on the finished backside of the lens. Regardless of the type of lens being molded, the edge gate may be raised vertically in the wall of receiver 60e. A higher gate results in the molten resin flowing in to the cavity at a greater spacing from the wafer. Since the resin is very hot, and under extreme pressure, the higher gate reduces the likelihood that it will disturb the wafer and curing coating located below it.

The substrate that could be used in this method could be any injection moldable lens material like polymethyl(meth) acrylate (PMMA), polycarbonate/polyester blends, polyamide, cyclic olefin copolymers, polyurethanes, etc. In a preferred embodiment the substrate is polycarbonate. An example of a suitable wafer, is a polarized PVC film sandwiched between two polycarbonate films. Wafers between about 0.5 mm and 1.5 mm thick are suitable for use with the methods according to the invention. The viscosity of the coating may be adjusted to a suitable low value, to insure that the weight of the wafer is sufficient to cause the intended spreading effect. If higher viscosity coatings are desired, it is possible to spread the coating via external pressure applied to the wafer. For example, a silicon pad or inflatable balloon could be installed into a third prong of arm 40. The arm would then motion through a third in-mold location to bring the pad or pads in registry over the deposited wafer for inflation.

The injection cycle is as usual and depends on the nature of the thermoplastic. Usually the mold temperature is in the range of 240° F. to 290° F., the melt temperature is in the range of 540° F. to 600° F., the packing pressure is in the range of 5,000 psi to 15,000 psi, the packing time is in the range of 10 sec to 50 sec, and the cooling time is in the range of 60 sec to 265 sec.

EXAMPLE

A liquid coating drop, 0.5 ml was deposited in the center of the concave surface of a 6 base metal insert. The insert was enclosed in the bottom mold half and had been constantly heated as the rest of the mold of which the temperature was maintained at 250 F. An auto dispenser or a scaled pipette may be used to deposit the coating.

A 1 mm thick 6 base polycarbonate ophthalmic wafer was placed on top of the coating drop to spread the coating out. The mold was then immediately closed. Partial curing of the coating was established via two minute delay after the mold closed, and prior to PC injection.

The PC lens molding process consisted of a mold temperature set at 250° F., melt temperature ranging from 535 F to 565 F, packing pressure set at 6150 psi for 12 seconds and a cooling phase of 60 seconds.

At the end of the lens injection molding cycle, the mold opened and the coated PC lens was ejected out of the mold. The polycarbonate wafer was an integral part of the molded lens with the optical clear coating on the front surface.

Following is the coating composition that was used in the example.

| COMPONENT | CONCENTRATION (%) |
|---|---|
| Ebecryl 5129 | 50.0 |
| Ebecryl 284N | 26.0 |
| Hydroxy propylmethacrylate | 15.28 |
| Isobornyl Acrylate | 7.6 |

-continued

| COMPONENT | CONCENTRATION (%) |
|---|---|
| t-butyl perbenzoate | 1.0 |
| Cobalt Naphthenate | 0.1 |
| Surfactant EFK 3034 | 0.02 |

A coating according to the present invention advantageously provides and/or includes at least the following characteristics:
- the coating is solvent free; in fact no volatile organic compounds (VOCs) should be generated during the in-mold coating process, which could perturb the polymerization parameters and thus the optical property of the lens;
- the coating is cured at a thermoplastic substrate high molding temperature while maintaining its optical clarity without etching the thermoplastic substrate;
- the coating can flow across the front surface of the lens before it gels and fast cures thereafter; the kinetic parameters are important to improve flow characteristics;
- the coating, advantageously, will impart desirable functional properties onto an ophthalmic lens such as, tintability, scratch resistance, etc.

A coating according to the present invention is thermally curable, optically clear, does not show visible interference fringes after coating onto a lens and comprises an optically transparent coating that is compatible with the lens material in order to adhere to it without causing any undesirable effects while imparting the desired features (tint, scratch resistance, etc.) onto the lens material.

A coating composition according to the present invention is preferably solvent less and includes an acrylate compound. The acrylate compound is preferably thermally cured, which means the coating may be cured via, e.g., azo, peroxides, and/or blocked tertiary amine. Chemically speaking, the coating composition preferably includes multi-functional acrylates comprising up to hexa functional groups and with various molecular weights. Preferably, the present invention comprises a multi-functional urethane acrylic coating that is modified to meet various competing requirements. For example, such coating needs to stay in liquid form to flow along a hot mold insert to an even thickness and then polymerize rather quickly, since the lens molding process is being extended by the coating set time. Indeed, a coating used in the present invention advantageously remains in liquid form to flow along a heated mold insert to a uniform thickness and then polymerizes quickly.

More particularly, a coating composition according to the present invention preferably comprises acrylates including monofunctional acrylates and/or monofunctional methacrylates such as isobornyl acrylate and hydroxylpropyl methacrylate, as well as tetrafunctional acrylates and/or tetrafunctional methacrylates and hexafunctional acrylates and/or hexafunctional methacrylates. Exemplary acrylates that may be used in the present invention may include and are not limited to reactive multifunctional acrylates, preferably hexafunctional aliphatic urethane acrylates. For example, exemplary acrylates used in the present invention may include hexafunctional acrylates and at least one difunctional acrylate. As noted herein, the term "(meth) acrylate" refers to either the corresponding acrylate or methacrylate.

Acrylates may be obtained from UCB Chemicals or from Sartomer and Henkel (a German Co.), and may in one embodiment comprise, e.g., Ebecryl™ brand acrylates. A brief general description of various Ebecryl acrylates in EB number formats which may be used according to the present invention is as follows:
1) 284: aliphatic urethane diacrylate diluted 12% with HDOHA. Excellent light fastness, exterior durability, toughness and good flexibility.
2) 1290: hexafunctional aliphatic urethane acrylate containing an acrylated polyol diluent. Provides fast cure with excellent hardness, solvent and abrasion resistance.
3) 5129: hexafunctional aliphatic urethane acrylate combining good scratch resistance with improved flexibility
4) 8301: hexafunctional aliphatic urethane acrylate containing an acrylated polyol diluent.

Use of hydroxylpropyl methacrylate presents a particular interest to slow down the reaction in the coating composition. Multi-functional acrylates of three functional groups or higher advantageously will provide more cross linking and result in higher abrasion resistance. For example, hexa-functional acrylates will provide a high degree of cross linking due to having six (6) functional groups. The urethane backbone of these high functional acrylates provides flexibility and greater ability to resist heat. Difunctional acrylate species are used to increase the flexibility and toughness and to control the viscosity of the formulation for process-ability to a certain extent.

A monofunctional methacrylate, such as hydroxylpropyl methacrylate, serves as a monofunctional diluent and kinetic modifier. It is used to terminate the reaction or to slow down the propagation of polymerization so that it will have some stability and a window of reactivity for processing. Monofunctional methacrylates used in a composition according to the present invention serve as reactive diluents and kinetic modifiers to improve flow characteristics.

With regards to the term acrylates, it is to be noted that methacrylates and other unsaturated compounds, whether mono- or multifunctional may also be used in addition to, or instead of, acrylates. In some cases methacrylates may experience a slower chemical reaction during polymerization. Acrylate or methacrylate compounds may be selected from the family of aliphatic urethane acrylates which include, e.g., from two to about six functional groups.

In a preferred embodiment of the present invention, high molecular weight acrylates (for example, acrylates having a molecular weight of at least 1000 centipoises (cps) or higher at 25° C.) are preferably used for ophthalmic injection molding according to the present invention. This embodiment presents the advantage of improved control of the viscosity and flow of the coating composition on a heated surface. For example, a high injection pressure requires a high viscosity flow to allow for the higher temperature (i.e., higher than room temperature) during applied extrusion. It is to be noted that the viscosity may further be adjusted as necessary based on the particular injection molding parameters and requirements.

In one embodiment of the present invention, the coating composition preferably comprises an acrylic base cured with an initiator (e.g., t-butyl perbenzoate). In fact, the thermal cure process of the present invention utilizes free radical polymerization. The initiator (t-butyl perbenzoate) obtains energy by absorbing heat to decompose and generate free radicals (that is, the free radical reaction is generated by thermal heating). These free radicals then attach monomers or oligomers (reactive multifunctional acrylates) to generate more free radicals to propagate the reaction to form long molecular chains and eventually a cross-linked network.

An in-mold coating composition according to the present invention preferably may further include at least one catalyst (initiator) and at least one metal salt. The catalyst may be selected from, e.g., alkyl aralkyl peracide, azo derivatives and blocked tertiary amine, is preferably selected from ketone peroxides, diacyl peroxides, dialkylperoxides, diperoxyketals and peroxyesters, and in a very preferred embodiment comprises tert-butylperbenzoate.

The examples disclosed herein preferably use peroxides derived from alkyl aralkyl peracide with a metal salt promoter. Peroxides are used to cure the coating via a free radical reaction. Metal salt promoters help to generate free radicals quickly and minimize oxygen inhibition. The metal salt and peroxide concentration are preferably chosen to fit a curing cycle for the current process. The concentration ratio can be varied as necessary to fit a particular process requirement. Again, although use of peroxides for curing is a preferred method, and more specifically tert-butyl perbenzoate is a preferred candidate, alternative methods for curing may include use of azo and blocked tertiary amine.

The metal salt is preferentially selected from cobalt naphthenate, cobalt octoate, cobalt neodecanoate, copper naphthenate, zinc naphthenate, and potassium octoate, and preferably, the metal salt comprises cobalt naphthenate.

In one embodiment, an exemplary coating composition according to the present invention comprises the following: (a) at least one hexafunctional acrylate and/or hexafunctional methacrylate compound; (b) at least one difunctional acrylate and/or a difunctional methacrylate compound; (c) Hydroxyl propylmethacrylate; (d) Isobornyl acrylate; (e) T-butyl perbenzoate; and (f) cobalt naphthenate.

An in-mold coating composition according the invention may optionally further include a surfactant which is preferably selected from a fluorinated surfactant or a silicone surfactant. That is, a surfactant such as a fluorinated surfactant (e.g., EFKA 3034) or a silicone surfactant (e.g., Silwet L-7602) may be included in a coating composition according to the present invention. The surfactant in the coating composition may be added to improve wetability of the mold surface.

The coating composition may also optionally include acrylic or epoxy functionalized colloids, for example, OG-101 or OG-103 (available from Clariant), or functionalized colloidal silica with acrylic silanes, or other colloids such as, e.g., cerium colloid, niobium colloid, and antimony colloid. An in-mold coating composition according to the present invention may further optionally include, e.g., a metal alkoxide which may be selected, for example, from zirconium isopropoxydes, methyl trimethoxysilane and tetraethoxysilane. A coating composition according to the present invention may further optionally include at least one dichroic dye, a photochromic dye and/or one liquid crystal.

It is to be understood by one of ordinary skill in the art that the coating should preferably retain its qualities at the lens substrate molding temperature, e.g., for a polycarbonate substrate, such temperature is around 250° F. Upon coating of an optical lens, a coating according to the present invention is optically clear and may have a thickness ranging from about 1 micron to about 100 microns. For example, typical abrasion resistance coating thickness ranges from about 1 micron to about 8 microns, and a photochromic system can be up to about 20 microns or more.

Advantageously, an in-mold coating composition according to the present invention provides very good anti-abrasion properties. To further increase abrasion resistance, it is also possible to include in the coating formulation according to the present invention acrylic or epoxy functionalized colloids, as discussed above. Metal alkoxides and its derivatives may also optionally be added as discussed above to increase refractive index, abrasion resistance and perhaps influence the rate of polymerization.

According to one embodiment, a coating composition according to the present invention comprises the following:

| | | |
|---|---|---|
| Hexafunctional aliphatic urethane acrylate | range: about 33% to 52% | preferred: 50% |
| Aliphatic urethane diacrylate diluted 12% with HDOHA | range: about 13% to 31% | preferred: 25% |
| Isobornyl acrylate | range: about 6% to 9% | preferred: 7.6% |
| Hydroxylpropyl methacrylate | range: about 12% to 18% | preferred: 16% |
| Tetrabutylperoxybenzoate | range: about 0.5% to 2% | preferred: 1% |
| Metal complex (e.g., cobalt naphthenate) | range: about 0.25 to 1% | preferred: 0.4% |

Having described preferred embodiments for lens manufacturing, materials used therein for coatings and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of injection molding a functionally enhanced coated thermoplastic optical lens in an injection molding machine having a horizontally oriented parting line with a metal concave insert disposed in the lower stationary mold half, wherein the insert has a base curve C and is heated to a temperature T below a thermoplastic glass transition temperature $T_G$, comprising the steps of:
    depositing an unpressurized liquid coating drop onto the concave insert while the mold is open;
    placing a functional ophthalmic wafer having a concave side and a convex base curve C side onto the coating drop, wherein the liquid coating has a sufficiently low viscosity so that the convex base curve C side of the wafer spreads the coating in the absence of back pressure across the entire base curve C surface of the insert under the weight of the wafer;
    closing the mold to heat and pre-cure the coating;
    injecting thermoplastic resin via an edge gate onto the concave side of the wafer; and
    integrally forming a functionally enhanced coated optical lens by allowing the resin to cool towards T, whereby the coating is intimately bonded to the convex base curve C side of the wafer.

2. The method of to claim 1, wherein the insert temperature T is in the range from about 240° F. to about 290° F.

3. The method of claim 1, wherein the insert temperature T is about 250° F.

4. The method of claim 1, wherein said closing step comprises:
    closing the mold and pausing to heat and pre-cure the coating.

5. The method of claim 4, wherein said injecting step initiates after a two minute pause.

6. The method of claim 4, wherein the injecting step initiates after the coating has pre-cured sufficiently to resist deformation by the force of the injected resin.

7. The method of claim 1, wherein the mold includes a movable top half that opens and closes vertically.

8. The method of claim 1, wherein the coating drop comprises a full metered charge of coating modified by diluents to avoid curing until the coating completely covers the convex base of the wafer.

9. The method of claim 8, wherein the full metered charge of coating amounts is deposited in an amount ranging between 0.1 ml to 0.8 ml.

10. The method of claim 1, wherein the coating is deposited in an amount ranging between 0.1 ml to 0.8 ml.

11. The method of claim 1, wherein the coating is deposited in an amount ranging between about 0.2 ml to about 0.5 ml.

12. The method of claim 1, wherein the wafer is a polarized film and said integrally forming step comprises integrally forming a polarized lens in which the film is protected on one side by the thermoplastic lens and on the other side by the cured coating.

13. The method of claim 1, wherein the wafer is a photochromic film and said integrally forming step comprises integrally forming a photochromic lens in which the film is protected on one side by the thermoplastic lens and on the other side by the cured coating.

14. The method of claim 1, wherein the thermoplastic resin and the wafer are independently selected from the group consisting of polymethyl(meth)acrylate, polycarbonate, polycarbonate/polyester blends, polyamide, polyester, cyclic olefin copolymers, polyurethane, polysulfone and combinations thereof.

15. The method of claim 14, wherein the resin and the wafer include the same material.

16. The method of claim 15, wherein the resin and the wafer include polycarbonate derivatives.

17. The method of claim 1, wherein the liquid coating includes one or more (meth)acrylate compounds, a catalyst, and a metal salt.

18. The method of claim 17, wherein the liquid coating includes at least one hexafunctional acrylate compound, at least one difunctional acrylate compound, and at least one monofunctional acrylate compound.

19. The method of claim 17, wherein the catalyst is a alkyl aralkyl peracide compound.

20. The method of claim 17, wherein the metal salt is cobalt naphthenate.

21. A method of injection molding a functionally enhanced coated thermoplastic optical lens in an injection molding machine having a horizontally oriented parting line with a metal concave insert disposed in the lower stationary mold half, wherein the insert has a base curve C and is heated to a temperature T below a thermoplastic glass transition temperature $T_G$, comprising the steps of:

depositing an unpressurized liquid coating drop onto the concave insert while the mold is open;

placing a functional ophthalmic wafer having a concave side and a convex base curve C side onto the coating drop, so that the convex base curve C side of the wafer spreads the coating across the entire base curve C surface of the insert;

closing the mold and pausing to heat and pre-cure the coating;

injecting thermoplastic resin via an edge gate onto the concave side of the wafer, wherein the injecting step initiates after the coating has per-cured sufficiently to resist deformation by the force of the injected resin; and integrally forming a functionally enhanced coated optical lens by allowing the resin to cool towards T, whereby the coating is intimately bonded to the convex base curve C side of the wafer.

22. The method of claim 21, wherein the wafer is a polarized film and said integrally forming step comprises integrally forming a polarized lens in which the film is protected on one side by the thermoplastic lens and on the other side by the cured coating.

23. The method of claim 21, wherein the wafer is a photochromic film and said integrally forming step comprises integrally forming a photochromic lens in which the film is protected on one side by the thermoplastic lens and on the other side by the cured coating.

* * * * *

UNITED STATES PATENT AND TRADEMARK OFFICE
CERTIFICATE OF CORRECTION

PATENT NO. : 7,906,047 B2  
APPLICATION NO. : 11/313500  
DATED : March 15, 2011  
INVENTOR(S) : Xu Chen et al.

Page 1 of 1

It is certified that error appears in the above-identified patent and that said Letters Patent is hereby corrected as shown below:

Column 10, line 55 (claim 2, line 1), following "of" delete "to."

Column 12, line 1 (claim 19, line 1), following "is" delete "a" and insert --an--.

Column 12, line 23 (claim 21, line 19), delete "per-cured" and insert --pre-cured--.

Signed and Sealed this
Thirty-first Day of May, 2011

David J. Kappos
*Director of the United States Patent and Trademark Office*